United States Patent
Kim (10) Patent No.: US 9,519,330 B2
(45) Date of Patent: Dec. 13, 2016

(54) ENERGY-EFFICIENT MULTICORE PROCESSOR ARCHITECTURE FOR PARALLEL PROCESSING

(71) Applicant: Wisconsin Alumni Research Foundation, Madison, WI (US)

(72) Inventor: Nam-Sung Kim, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 235 days.

(21) Appl. No.: 14/060,037

(22) Filed: Oct. 22, 2013

(65) Prior Publication Data
US 2015/0113304 A1   Apr. 23, 2015

(51) Int. Cl.
*G06F 1/32* (2006.01)

(52) U.S. Cl.
CPC ............. *G06F 1/324* (2013.01); *G06F 1/3296* (2013.01); *G06F 1/3228* (2013.01); *G06F 1/3243* (2013.01)

(58) Field of Classification Search
CPC ....... G06F 1/324; G06F 1/3243; G06F 1/3228
See application file for complete search history.

(56) References Cited

U.S. PATENT DOCUMENTS

| | | | | | |
|---|---|---|---|---|---|
| 4,893,271 | A * | 1/1990 | Davis | ......................... | G06F 1/08 365/227 |
| 6,317,841 | B1 * | 11/2001 | Nagae | ................... | G06F 1/3228 713/300 |
| 6,606,713 | B1 * | 8/2003 | Kubo | ........................ | G06F 1/06 713/501 |
| 6,836,849 | B2 * | 12/2004 | Brock | ................... | G06F 1/3203 713/300 |
| 7,444,531 | B2 * | 10/2008 | Vorbach | ................ | G06F 1/3203 713/300 |
| 2002/0095610 | A1 * | 7/2002 | Nunomura | ............ | G06F 1/3203 713/322 |
| 2003/0237012 | A1 * | 12/2003 | Jahagirdar | ................ | G06F 1/08 713/500 |
| 2004/0010679 | A1 * | 1/2004 | Moritz | .................. | G06F 1/3203 713/1 |
| 2004/0017234 | A1 * | 1/2004 | Tam | ......................... | G06F 1/08 327/141 |
| 2004/0138833 | A1 * | 7/2004 | Flynn | .................... | G06F 1/3203 702/58 |
| 2004/0187040 | A1 * | 9/2004 | Sasagawa | ............. | G06F 1/3203 713/300 |

(Continued)

OTHER PUBLICATIONS

T.Li, Alvin R. Lebeck and Daniel J. Sorin; Spin Detection Hardware for Improved Management of Multithreaded Systems; IEEE Transactions on Parrellel and Distibuted Systems, vol. 17, No. 6, pp. 1-14, Jun. 2006, US.

(Continued)

*Primary Examiner* — Phil Nguyen
*Assistant Examiner* — Gary Collins
(74) *Attorney, Agent, or Firm* — Boyle Fredrickson, S.C.

(57) ABSTRACT

A multicore computer architecture provides for clock dividers on each core, the clock dividers capable of providing rapid changes in the clock frequency of the core. The clock dividers are used to reduce the clock frequency of individual cores spinning while waiting for a synchronization instruction resolution such as a lock variable. Core power demands may be decreased before and after change in dock speed to reduce power bus disruption.

19 Claims, 3 Drawing Sheets

(56) References Cited

U.S. PATENT DOCUMENTS

| | | | |
|---|---|---|---|
| 2005/0166073 A1* | 7/2005 | Lee | G06F 1/3203 713/300 |
| 2005/0268106 A1* | 12/2005 | Mansell | G06F 13/24 713/182 |
| 2010/0293401 A1* | 11/2010 | de Cesare | G06F 9/526 713/320 |
| 2011/0252258 A1* | 10/2011 | Im | G06F 1/3203 713/323 |
| 2012/0144218 A1* | 6/2012 | Brey | G06F 1/324 713/322 |
| 2013/0047011 A1* | 2/2013 | Dice | G06F 9/485 713/320 |
| 2015/0006915 A1* | 1/2015 | Ganesan | G06F 1/26 713/300 |

OTHER PUBLICATIONS

Jian Li, Jose F. Martinez and Michael C. Huang; The Thrifty Barrier: Energy-Aware Synchronization in Shared-Memory Multi-processors; IEEE Int. Symp. on High Performance Computer Architecture (HPCA), Feb. 2004; pp. 14-23; Madrid Spain.

* cited by examiner

ENERGY-EFFICIENT MULTICORE PROCESSOR ARCHITECTURE FOR PARALLEL PROCESSING

STATEMENT REGARDING FEDERALLY SPONSORED RESEARCH OR DEVELOPMENT

This invention was made with government support under HR 0011-12-2-0019awarded by the DOD/DARPA. The government has certain rights in the invention,

CROSS REFERENCE TO RELATED APPLICATION

Not Applicable

BACKGROUND OF THE INVENTION

The present invention relates to a computer architecture and in particular to a "multicore" architecture providing improved energy efficiency when multiple processor cores are synchronized in the execution of parallel programs sharing common data.

Current microprocessor architectures provide multiple processor cores each providing independent processor functions. Each of the processor cores may execute a different "thread" of a multithreaded program so that the threads may be executed in parallel for improved speed of execution. For example, a computer server for the Internet may use a multicore processor running a multithreaded server program where each separate client-server transaction runs as a separate parallel thread.

During parallel operation, the program threads may need to modify common data shared among the threads. For example, in the implementation of a transaction-based airline reservation system, multiple threads handling reservations for different customers may read and write common data indicating the number of seats available. If the threads are not coordinated in their use of the common data, serious error can occur. For example, a first thread may need to read a variable indicating an airline seat is available and then set that variable indicating that the seat has been reserved by the thread's client. If a second thread reads the same variable prior to its setting by the first thread, the second thread may, based on that read, erroneously set that variable again with the result that the seat is double booked.

To avoid these problems, it is common to use synchronizing instructions ("synchronizing primitives"), for example a lock variable, to synchronize threads during a portion of their operation (often called critical sections) where simultaneous execution by more than one thread would be a problem. A lock variable has one value indicating that it is owned by a thread and another value indicating that it is available. A thread must acquire the lock before executing the critical section and does so by reading the lock variable and, if it is not held, writing a value to it indicating that it is held. When the critical section is complete, the thread again writes to the lock variable a value indicating that the lock is available again.

Typically, the instructions used to acquire the lock are "atomic instructions", that is, instructions that cannot be interrupted once begun by any other thread, or quasi-atomic instructions that can be interrupted by another thread, but that make such interruption evident to the interrupted thread so that the instructions can be repeated.

When a thread cannot acquire the lock, the processor executing the thread may "spin", ceasing forward progress in execution of the thread while it waits for availability of the lock. This weighting process entails periodic checking of the lock variable typically stored in memory. Other synchronization primitives such as barriers and conditions also employ this spinning technique.

Other types of synchronization instructions, for example, may cause the processors to spin at a given execution point in each thread until all processors have reached that execution point. Generally three types of synchronization primitives (barriers, locks, and conditions) cause one or more processors to spin as they wait for the synchronization process to complete.

While the processor is spinning, it does not perform useful work but consumes substantial power. Generally, the processor cannot be powered down while spinning in order to preserve its architectural states so that it may later resume operation and to allow the processor to operate so that it can check on a periodic basis to determine whether the lock has become available.

One method to avoid wasting processor resources is to suspend the given thread and switch the associated processor to begin executing a different thread, for example, using a futex technique. In order to do this, the operating system or another mechanism must be provided to switch the processor context and wake the sleeping thread when the lock is available. Such an approach requires multiple operating system "calls" that each consume many processor cycles.

SUMMARY OF THE INVENTION

The present inventor has recognized that for an important class of fine-grained, parallel operations, synchronization events can occur as frequently as one microsecond. At such speeds, futex-type approaches of moving threads among processors (requiring time-consuming multiple operating system calls) can be impractical. A similar problem attends to changing the operating voltage or clock of the processor cores, where it takes tens of microseconds for clock phase locked loops and off-chip voltage regulators to make the necessary adjustments. Generally, on-chip adjustment of the operating voltage of individual processor cores, required to prevent degradation of active threads, would require too much processor core cost for the necessary voltage regulators when implemented on a chip.

The present invention avoids the problem of system calls and expense of multiple rapidly switching voltage domains by reducing the frequency of the clock of the spinning processor. The time necessary for the clock phase locked loop to stabilize is eliminated, in one embodiment, through the use of a post-divider circuit that allows the phase locked loop to continue without interruption during the frequency adjustment. The processor with the reduced clock speed may operate in the environment of the other processors by making frequency adjustments that conform to factors of powers of two. Power fluctuations resulting from abrupt clock frequency changes may be minimized by disabling functions of the processors before the clock frequency changes.

Specifically, the invention provides an architecture for a computer system which includes multiple processor cores each having a processor core clock input and operating according to a clock signal received at the processor core clock input to execute instructions of an instruction set in synchrony with the clock signal. A frequency selector associated with each given processor core has a selector input for receiving at least two frequency stable clock signals, a selection input for receiving a desired frequency selection from the given processor core, and a selector output for outputting one of the frequency stable clock signals to the processor core clock input depending on the selection input. The given processor core may execute an instruction set including at least one instruction executing to change the selection input of a frequency selector associated with a processor core executing at least one instruction.

It is thus a feature of at least one embodiment of the invention to allow processor cores to reduce their clock speed during the spinning operation to meaningfully conserve energy during tine-grained synchronization events that would be fatally slowed by multiple operating system calls. It is another feature of at least one embodiment of the invention to provide a mechanism for reducing the energy used by a spinning processor core without the need for multiple voltage domains for each processor core. In contrast to on-chip voltage regulators, the necessary frequency selection circuitry is compact or already available for other purposes.

The frequency selector may provide for selection among frequencies limited to frequencies related according to two to the power of an integer.

It is thus a feature of at least one embodiment of the invention to allow flexible changes in the clock frequency of one processor core without disrupting the ability of the processor core to communicate with other system elements, for example, circuitry necessary for memory access.

One instruction may change the output clock between a clock frequency close to the minimum operating frequency of the processor and standard operating frequency, for example, employed by the processor cores that are not in a spin state. The frequency differences may be greater than eight.

It is thus a feature of at least one embodiment of the invention to provide substantial power savings by reduction of clock frequency while preserving the architectural state and functionality of the spinning processor core.

The frequency selector may provide a change of output frequency from a first to a second frequency where the second frequency is stabilized in less than 10 µs of the change.

It is thus a feature of at least one embodiment of the invention to permit significant energy savings in situations where there are fine-grained synchronization events. By providing a frequency selector that has rapid action, deeper energy savings can be obtained for programs of this type.

In one embodiment, the frequency selector may be a programmable frequency divider associated with each given processor and receiving as a selector input a divisor wherein the output clock has a frequency lower than the input clock according to the divisor input.

It is thus a feature of at least one embodiment of the mention to provide a high-speed frequency changing method that, unlike a phase locked loop, has minimal or no block capture time.

In particular, the programmable frequency divider may be a binary counter whose output may be selected according to the divisor input.

It is thus a feature of at least one embodiment of the invention provide a state machine providing rapid frequency changes that also conform to integer power of two frequency ratios reducing disruption when one processor core operates at a different frequency.

The computer system may include a clock signal providing a common clock signal and a phase locked loop associated with each given processor core, each phase locked loop receiving the common clock signal and providing an input clock signal to an associated programmable frequency divider of a given processor core.

It is thus a feature of at least one embodiment of the invention to provide an architecture that works with common phase locked loop clock distribution systems and in fact may make use of a post-divider often incorporated in such phase locked loop circuits.

At least one instruction of the instruction set may be a synchronization instruction providing an atomically executable memory access to read a lock variable.

It is thus a feature of at least one embodiment of the invention to provide an architecture that works with common synchronization techniques.

The multiple processor cores may be on a single integrated circuit.

It is thus a feature of at least one embodiment of the invention to provide a system that may accommodate rapid synchronization events that can occur with short inter-processor core distances.

The instruction may provide reduction in processor core's execution capabilities before a change in selection input decreasing a frequency of the output clock to the processor core.

It is thus a feature of at least one embodiment of the invention to minimize power grid disruptions that may occur with rapid changes in processor core power usage when clock frequencies are abruptly shifted.

The reduction in processor execution capabilities may be the elimination of instruction fetch capabilities for fetching instructions of the instruction set from an electronic memory.

It is thus a feature of at least one embodiment of the invention to provide a power reduction in functionality not required during normal spinning.

The instruction may provide an increase in processor core's execution capabilities before a change in divisor input increasing frequency of the output clock to the processor core.

It is thus a feature of at least one embodiment of the invention to provide a symmetric ramping up of chip power also to reduce power grid disruptions.

These particular objects and advantages may apply to only some embodiments falling within the claims and thus do not define the scope of the invention.

DETAILED DESCRIPTION OF THE PREFERRED EMBODIMENT

Figure 1:
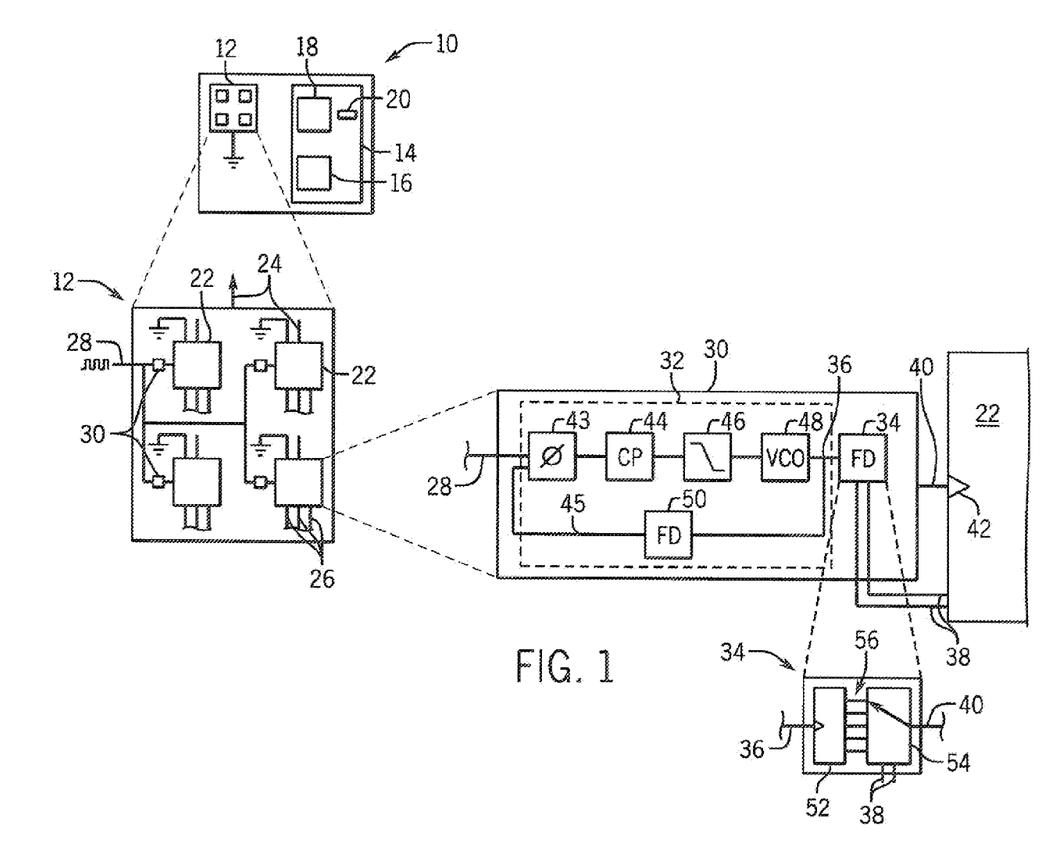
FIG. 1 is a block diagram of an electronic computer showing in expanded detail a multicore processor with multiple processor cores each having a dedicated phase locked loop, and showing an expanded detail of the phase locked loop associated with each processor core and an expanded detail of a post-phase locked loop divider.

Referring now to FIG. 1, an electronic computer 10 may provide for a processing system 12 communicating with an electronic memory 14 to receive instructions and data from the memory 14 for execution by the processing system 12 and to allow outputting of data to the memory 14. The memory 14 may be any type of solid-state non-transient memory as is known in the art.

Generally the memory 14 will store one or more application programs 16, an operating system 18, and various data 20 including, for example, lock variables.

The processing system 12 may provide a multicore architecture with multiple independently operating processors or processor cores 22. Each processor core 22 may receive common electrical power 24 (for example, of a single voltage domain) and may provide for various address, data, and control lines 26, as is generally understood in the art, allowing for reading and writing of the memory 14 and the communication with other hardware of the processing system 12 shared by the processor cores 22, such as a power control unit (not shown). As is understood in the art, each processor core 22 provides transistor circuits implementing a variety of processing functions including arithmetic logic, multiple registers, memory caches and the like to permit independent execution of instructions as is generally understood in the art.

These processor cores 22 may be formed on a single integrated circuit die or may be on multiple dies attached on a substrate providing a common thermal environment communicating with a heatsink or the like. Generally the cores 22 provide for rapid core-to-core communication that allow for coordination of rapid synchronization events among cores 22. This rapid communication is not currently possible with the multiprocessor systems having physically separated cores 22; however, the present invention may be applicable in such environments when rapid synchronization events occur.

Referring still to FIG. 1, the processing system 12 may receive a common clock signal 28 providing a timing signal for synchronous circuits within the cores 22. This common clock signal 28 may be connected to multiple phase locked loop systems 30 associated with each processor core 22, the phase locked loop systems 30 operating to multiply the frequency of the clock signal 28 upward for use by the processor core 22, this multiplication allowing the common clock signal 28 to be of lower frequency making the transmission of the clock signal 28 among the processor cores 22 more power efficient.

The phase locked loop system 30 will generally include a phase locked loop 32 followed by a post phase locked loop (PLL) divider 34. As noted, the phase locked loop 32 increases the frequency of the common clock signal 28 to provide a higher frequency input clock signal 36 received by the post-PLL divider 34. As is generally understood in the art, the phase locked loop 32 includes a phase comparator 43 which determines a phase difference between the common clock signal 28 and a feedback clock signal 45 to be described. The phase error output by the phase comparator 43 is integrated by a charge pump 44 and then filtered by low pass filter 46 to provide an input to a voltage controlled oscillator 48 controlling the frequency of the voltage controlled oscillator 48. The output of the voltage controlled oscillator 48 goes to a feedback frequency divider 50, typically a binary counter or the like, which divides down the frequency of the output of the voltage controlled oscillator 48 to provide the feedback clock signal 45 to the phase comparator 43. The operation of this feedback loop is to multiply the common clock signal 28 in frequency by the divisor value of the feedback frequency divider 50 to produce the input clock signal 36 communicated to the post-PLL divider 34. This multiplication may be by many orders of magnitude, for example, increasing a common clock signal 28 of tens or hundreds of megahertz to multiple gigahertz.

The feedback loop provided by the phase locked loop 32 requires a significant amount of time, on the order of 20 microseconds, to "re-lock" when the divisor value of the feedback frequency divider 50 is changed. This relock time results from the intrinsic time constant of the charge pump 44 and the low pass filter 46 which are band limited to provide for stability and accuracy in the steady-state phase lock of the phase locked loop 32. Accordingly, rapid changes of the output clock signal 40 to the processor core 22 on the order of one microsecond cannot be obtained by adjustment of the phase locked loop 32.

The post-PLL divider 34 receives the input clock signal 36 from the phase locked loop system 30 and reduces its frequency to produce an output clock signal 40 provided to the processor clock input 42 of the processor core 22. In this regard, the post-PILL divider 34 serves as a frequency selector. The frequency of the output clock signal 40 from the post-PLL divider 34 is controlled by selection inputs 38 which in this case provide a divisor value to divide down the input clock signal 36.

Figure 5:
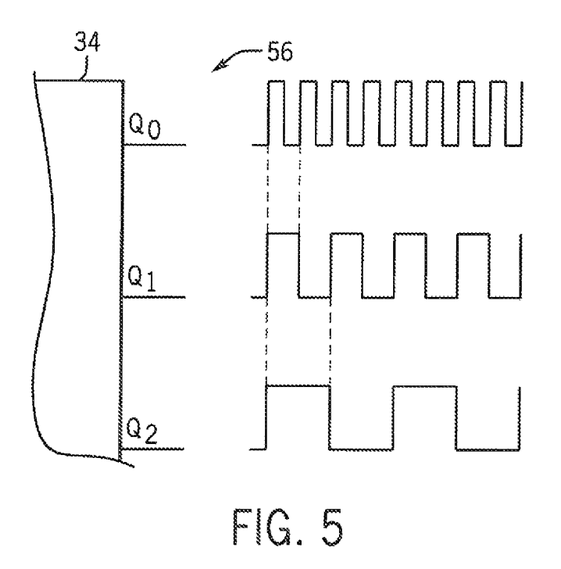
FIG. 5 is a fragmentary representation of output signals from a binary counter which may be used as a frequency divider providing integer power of two division selections.

The input clock signal 36 to post-PLL divider 34 may be received, for example, at a clock input of a binary counter 52 or other suitable state machine followed by a demultiplexer 54 that selects one of the output taps 56 of the binary counter 52 according to selection inputs 38. Referring also to FIG. 5, the binary counter 52 will provide a set of output taps 56 dividing the clock signal 36 by successive powers of two for example, $1/2^0$, $1/2^1$, $1/2^2$, $1/2^3$, etc. It will be appreciated then that according to the selection of the output tap 56 of the binary counter 52 a divisor of $2^N$ may be obtained where N is an integer related to the particular output tap 56 of the binary counter 52. Unlike changing frequency of the phase locked loop 32, the post-PLL divider 34 may change the frequency of output clock signal 40 in response to respond to a changed selection input 38 on a substantially instantaneous basis and on an order of one microsecond or less. This is possible because the post-PLL divider 34 executes a simple state machine without feedback stability requirements. By making frequency shifts that are powers of two divisors, the integration of the processor core 22 having a reduced clock frequency with the rest of the processing system 12 is preserved allowing the processor core 22 to communicate with memory and the like even when operating at a different clock frequency than the other processor cores 22.

Generally, the demultiplexer 54 will provide a selection between two principal stable frequencies to be used for output clock signal 40 during operation of the processor core 22: (1) a standard operating speed used by all processor cores 22 that are not spinning and generally being the maximum operating speed of the processor core 22 within thermal constraints, and (2) a reduced operating speed below the standard operating speed being the lowest value of clock speed obtained from an output tap 56 above the minimum operating clock speed of the processor core 22. The minimum operating clock speed of the processor core 22 is generally the speed at which the processor core 22 must execute in order to maintain its architectural state and integrate with the rest of the processing system 12, for example, with respect to reading and writing memory 14. Multiple output taps 56 may nevertheless be employed with demultiplexer 54 to enable the present invention to be used with different clock speeds of the common clock signal 28 as is understood in the art. In this respect a power control unit normally used for control of the common clock speed and the output clock signal 40 may select a subset of taps of the demultiplexer 54 activated by the selection input 38 depending on the selected overall frequency of the common clock signal 28. In particular, output tap 56 providing the lowest value of clock speed may be decreased as the frequency of the common clock signal 28 is increased.

Figure 4:
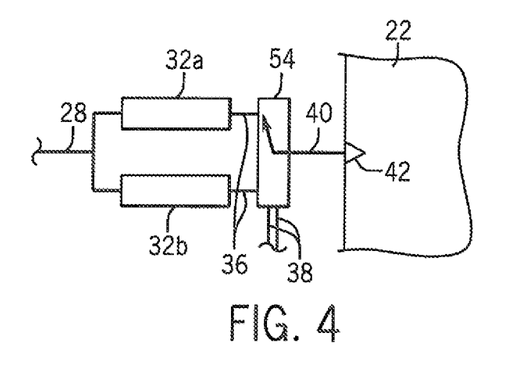
FIG. 4 is a second embodiment of the invention using multiple phase locked loops for rapid frequency switching.

Referring momentarily to FIG. 4, it will be appreciated that other frequency selectors may be used to provide for rapid frequency changes of the output clock signal 40 of the desired scale including, for example, providing multiple phase locked loops 32*a* and 32*b* for each processor core 22, each phase locked loop 32*a* and 32*b* set to a different stable output frequency whose outputs provide the output taps 56 and communicate with the demultiplexer 54. The phase locked loops 32*a* and 32*b* may be set to desired different frequencies, for example differing by factors of $2^N$, by adjustment of the divisor of the respective feedback frequency divider 50.

In all cases, the frequency selector may provide for rapid change in frequency and stabilization of this frequency in less than 10 microseconds a typical stabilization time of a phase locked loop and preferably less than 5 microseconds and even more preferably less than 1 microsecond or a typical rate of synchronization events on a single chip multiprocessor.

Figure 2:
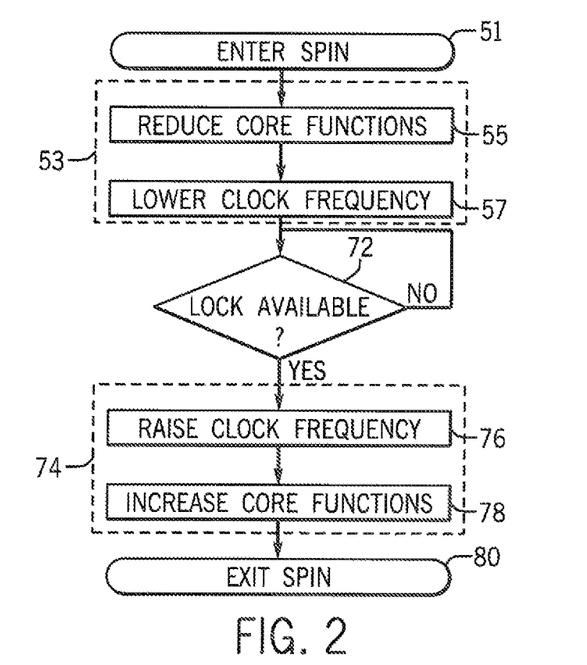
FIG. 2 is a flowchart of a spin routine showing use of two instructions of the present invention for saving power during spin.

Referring now also to FIG. 2, an application program 16 may employ, for example, a synchronization technique using a lock variable necessary to access lock value data 20 (shown in FIG. 1) in a critical program section of the thread executed on a given processor core 22. For this purpose, a lock instruction may be executed in which the thread tries to obtain a lock variable and if the lock variable cannot be obtained, the processor core 22 enters a spin state. Pseudocode for the spin state may have the following form:

```
void spin_lock(spin_lock_t *spinlock)
{
    while (compare_and_exchange(spinlock, 0, 1) = = 1)
    {
        // spin-wait (do nothing);
    }
}
```

Instructions of this spin state are augmented as represented by the flowchart of FIG. 2 in which, after an initial failure to obtain the lock variable, the thread of an application program 16 enters a spin state indicated by entry point 51. Upon entry into the spin state, a special entry instruction 53 may be executed by the processor core 22. This entry instruction 53 may include sub-instructions that reduce core functions, as indicated by process block 55, to lower the power demand by the processor core 22 and that lower the clock frequency of output clock signal 40 received by the processor core 22, as indicated by process block 57.

Figure 3:
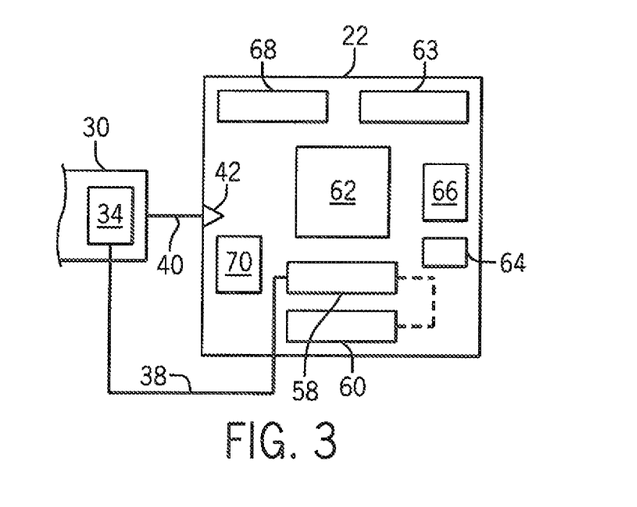
FIG. 3 is a block diagram showing the functional capabilities of the processor core which may be selectively shut down at times of clock transition.

Referring momentarily to FIG. 3 the special entry instruction 53, for example, may be implemented by an instruction decoder 58 of the processor core 22 which receives instructions fetched by the instruction fetch circuit 60 which are then provided to the arithmetic logic unit 62. In the above-described embodiment, the instruction decoder 58, when receiving entry instruction 53, may deactivate functional elements of the processor core 22 that are not necessary during the spinning of the processor core 22. For example, the instruction fetch circuit 60 may be deactivated because no additional instructions will be fetched during the spin of the processor core 22. Other functions of the processor core 22 may also be deactivated either explicitly or by virtue of the lack of incoming fetched instructions. Examples of such functions include pipelining circuitry 63, branch prediction circuitry 64, floating-point processing circuitry 66, and cache circuitry 68. Generally these functions will be deactivated in a way that preserves their architectural state (for example, simply by not using the functions). Other functions will be maintained during the spinning; for example, the function of the bus interface circuitry 70 will normally be retained in operation so that the lock contention can be evaluated.

After decreasing the functions of the processor core 22, the instruction decoder 58 may send a new divisor along selection input 38 to the post-PLL divider 34 of the phase locked loop system 30 to divide the clock frequency of output clock signal 40 from its normal operating value by divisor $2^N$ close to the minimum operating clock necessary for operation of the processor core 22 such that it does not lose its architectural state and can continue to execute the instructions of FIG. 2.

After the conclusion of entry instruction 53, the processor core 22 may loop as indicated by decision block 72 checking at each loop iteration to see if the lock variable is available. If the lock variable is not available the looping continues until a loop timeout value may, for example, throw an error. This looping constitutes the spinning of the processor core 22.

If during the looping the lock variable becomes available, then the thread proceeds to an exit instruction 74 which implements the steps of the entry instruction 53 in reverse order, first raising the clock speed back to its normal operating frequency per sub-instruction of process block 76 and then turning processor core 22 functions back on per sub-instruction of process block 78. At that point the spin may be exited as indicated by process exit point 80.

The process of reducing processor core 22 functions reduces the power demand of the processor core 22 at the time of changing the frequency of output clock signal 40. This latter frequency change changes the power consumption of the processor core 22 and, by reducing the power consumption baseline of the processor core 22, the change in power consumption is likewise reduced. Reducing the change in power consumption that occurs rapidly when the frequency of the output clock signal 40 is changed (not moderated by the phase locked loop 32) reduces electrical noise on the power distribution bus of the processing system 12 that may otherwise disrupt other circuitry of the processing system 12 and other processor cores 22.

Instructions 53 and 74 will generally be accessible to programmers of the processor cores 22 either directly or through compilers or the like. Alternatively, you the sub instructions 55, 57, 76, and 78, may be exposed to the programmer. The invention also contemplates that instructions 53 and 74 may be incorporated into other synchronization instructions.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

The multiple processor cores 22 may include not only general-purpose processing processor cores but also specialized processor cores 22, for example, for graphics processing and the like. Generally a multicore processor as used herein includes processors where different processing processor cores 22 share common clock timing and thus must be operated at the same clock frequency or with synchronized clock frequencies having different multiples. The invention is not limited to multicore processors and may be used with any integrated circuit where independent supply voltage adjustment of different circuit elements may be desired after fabrication.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

What I claim is:

1. A computer system comprising:
   multiple processor cores each having a processor core clock input and operating according to a clock signal received at the processor core clock input to execute instructions of an instruction set in synchrony with the clock signal; and
   a frequency selector associated with each given processor core having a selector input for receiving at least two non-zero frequency stable clock signals, a selection input for receiving a desired frequency selection from the given processor core, and a selector output for outputting one of the frequency stable clock signals to the processor clock input depending on the selection input;
   wherein the instruction set includes at least one instruction executing to change the selection input of a frequency selector associated with a processor core executing the at least one instruction;
   wherein the at least two frequency stable clock signals are received from at least one state machine divider without feedback stability requirements;
   wherein the at least one instruction of the instruction set is a synchronization instruction causing the frequency selector to select a reduced non-zero frequency-stable clock signal during a synchronization and causing the processor to spin while it waits for the synchronization to complete, to exit from the spin based on a event indicating synchronization is complete, and upon that exit causing the frequency selector to select an increased non-zero frequency-stable clock signal.

2. The computer system of claim 1 wherein the frequency selector provides for selection among frequencies limited to frequencies related according to two to a power of an integer.

3. The computer system of claim 1 wherein the at least one instruction changes the output clock between a first frequency substantially equal to the minimum operating frequency of the processor core and a second frequency higher than the first frequency.

4. The computer system of claim 3 wherein the second value is substantially equal to a highest operating frequency among the processor cores.

5. The computer system of claim 3 wherein the first frequency is at least ½ of the second frequency.

6. The computer system of claim 1 wherein the frequency selector provides a change of output frequency from a first to a second frequency where the second frequency is stabilized within 10 μof the change.

7. The computer system of claim 1 wherein the frequency selector is a programmable frequency divider associated with each given processor and receiving as a selector input a divisor wherein the output clock has a frequency lower than the input clock according to the divisor input.

8. The computer system of claim 7 wherein the programmable frequency divider provides a binary counter whose output may be selected according to the divisor input.

9. The computer system of claim 7 further including a clock signal providing a common clock signal and a phase locked loop associated with each given processor core, each phase locked loop receiving the common clock signal and providing an input clock signal to an associated programmable frequency divider of a given processor core.

10. The computer system of claim 1 wherein at least one instruction of the instruction set is a synchronization instruction t providing an atomically executable memory access to read a lock variable.

11. The computer system of claim 1 wherein the multiple processors are on a single integrated circuit.

12. A computer system comprising:
    multiple processor core each having a processor core clock input and operating according to a clock signal received at the processor core clock input to execute instructions of an instruction set in synchrony with the clock signal; and
    a frequency selector associated with each given processor core having a selector input for receiving at least two frequency stable clock signals, a selection input for receiving a desired frequency selection from the given processor core, and a selector output for outputting one of the frequency stable clock signals to the processor clock input depending on the selection input;
    wherein the instruction set includes at least one instruction executing to change the selection input of a frequency selector associated with a processor core executing the at least one instruction:
    wherein the at least two frequency stable clock signals are received from at least one state machine divider without feedback stability requirements;
    wherein the at least one instruction provides a reduction in a processor core's execution capabilities that decreases core power consumption at a time before a change in selection input that decreases a frequency of the output clock to the processor core; the time before a change having a predetermined length to reduce electrical noise on a power distribution bus of the multiple processor cores.

13. The computer system of claim 12 wherein the reduction in processor core's execution capabilities is an elimination of instruction fetch capabilities for fetching instructions of the instruction set from an electronic memory.

14. The computer system of claim 12 wherein the at least one instruction provides a an increase in processor core's execution capabilities that increases power consumption at a time after a change in selection input that increases the frequency of the output clock to the processor, the time after a change having a predetermined length to reduce electrical noise on a power distribution bus of the multiple processor cores.

15. The computer system of claim 14 wherein the increase in processor core's execution capabilities is a reestablishment of instruction fetch capabilities for fetching instructions of the instruction set from an electronic memory.

16. A method of synchronizing multiple processor cores in a computer system having multiple processor cores each having a processor core clock input and operating according to a clock signal received at the processor core clock input to execute instructions of an instruction set in synchrony with the clock signal: and
　a frequency selector associated with each given processor core having a selector input for receiving at least two frequency stable clock signals, a selection input for receiving a desired frequency selection from the given processor core, and a selector output for outputting one of the frequency stable clock signals to the processor clock input depending on the selection input;
　wherein the instruction set includes at least one instruction executing to change the selection input of a frequency selector associated with a processor core's executing the at least one instruction;
　wherein the at least one instruction of the instruction set is a synchronization instruction causing the frequency selector to select a reduced non-zero frequency-stable clock signal during a synchronization and causing the processor to spin while it waits for the synchronization to complete, to exit from the spin based on a event indicating synchronization is complete, and upon that exit causing frequency selector to select an increased non-zero frequency-stable clock signal;
the method comprising the steps of:
(a) providing execution of a program among the multiple processor cores, the program having synchronization points;
(b) in a given processor core, spinning at the synchronization points for a period of time in a synchronization process;
(c) at a beginning of the period of time, decreasing the output clock to the given processor core; and
(d) at an end of the period of time, increasing the output clock of the given processor core.

17. The method of claim 16 wherein the synchronization process is selected from the group consisting of a lock acquisition, a conditional synchronization, and an arrival at a synchronization bather.

18. The method of claim 16 wherein step (c) further includes the step of decreasing the functions of the given processor core before decreasing the output clock of the given processor core, and step (d) includes the step of increasing the functions of a given processor core before increasing the output clock of the given processor core.

19. The computer system of claim 1 wherein the at least two frequency stable clock signals are generated by at least one divider after a single phase locked loop.

* * * * *